United States Patent
Holmqvist et al.

(10) Patent No.: US 9,876,688 B2
(45) Date of Patent: Jan. 23, 2018

(54) DYNAMIC NEIGHBORING CELL MEASUREMENTS

(71) Applicant: Telefonaktiebolaget LM Ericsson (publ), Stockholm (SE)

(72) Inventors: Magnus Holmqvist, Eslöv (SE); Fredrik Carlsson, Hjärup (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/103,626

(22) PCT Filed: Dec. 12, 2013

(86) PCT No.: PCT/EP2013/076340
§ 371 (c)(1),
(2) Date: Jun. 10, 2016

(87) PCT Pub. No.: WO2015/086068
PCT Pub. Date: Jun. 18, 2015

(65) Prior Publication Data
US 2017/0026248 A1    Jan. 26, 2017

(51) Int. Cl.
*H04M 11/04* (2006.01)
*H04L 12/24* (2006.01)
(Continued)

(52) U.S. Cl.
CPC ........... *H04L 41/12* (2013.01); *H04B 17/309* (2015.01); *H04L 63/0853* (2013.01);
(Continued)

(58) Field of Classification Search
CPC ..... H04W 4/22; H04W 76/007; H04W 88/06; H04W 48/18; H04W 48/16;
(Continued)

(56) References Cited

U.S. PATENT DOCUMENTS

2008/0102784 A1* 5/2008 Mittal .................... H04M 11/04
                                                    455/404.1
2011/0249624 A1    10/2011 Ramachandran et al.
(Continued)

FOREIGN PATENT DOCUMENTS

EP        2343927 A1    7/2011

OTHER PUBLICATIONS

Unknown, Author, "Cell Selection and Reselection Process", TSG-RAN Working Group 2 (Radio layer 2 and Radio layer 3), TSGR2#7(99)A89, Ericsson, Malmo, Sweden, Sep. 20-24, 1999, 1-10.
(Continued)

*Primary Examiner* — Fred Casca
(74) *Attorney, Agent, or Firm* — Murphy, Bilak & Homiller, PLLC

(57) ABSTRACT

A method is disclosed of a wireless communication device connectable to a subscriber identity module and adapted to communicate with a wireless communication network using one of a first radio access technology and a second radio access technology. The method comprises determining if the subscriber identity module supports the second radio access technology and determining if the wireless communication network supports emergency call using the second radio access technology. If the subscriber identity module does not support the second radio access technology, the method comprises performing neighboring cell measurements for the second radio access technology only if the wireless communication network supports emergency call using the second radio access technology. Corresponding computer program product, arrangement and wireless communication device are also disclosed.

13 Claims, 2 Drawing Sheets

(51) Int. Cl.
  *H04W 24/10* (2009.01)
  *H04W 52/00* (2009.01)
  *H04W 76/00* (2009.01)
  *H04B 17/309* (2015.01)
  *H04W 8/18* (2009.01)
  *H04L 29/06* (2006.01)
  *H04W 4/22* (2009.01)
  *H04W 88/06* (2009.01)

(52) U.S. Cl.
  CPC ........... *H04W 8/183* (2013.01); *H04W 24/10* (2013.01); *H04W 52/00* (2013.01); *H04W 76/007* (2013.01); *H04W 4/22* (2013.01); *H04W 88/06* (2013.01)

(58) Field of Classification Search
  CPC . H04W 36/0083; H04W 88/10; H04W 24/02; H04W 36/06; H04W 36/08; H04W 48/02; H04W 48/08
  USPC ......... 455/404.1, 456.1, 404.2, 435.1, 435.2, 455/436, 450, 422.1, 434, 437, 552.1; 370/331
  See application file for complete search history.

(56) References Cited

U.S. PATENT DOCUMENTS

| | | |
|---|---|---|
| 2012/0178402 A1 | 7/2012 | Krishnamoorthy et al. |
| 2013/0064176 A1* | 3/2013 | Hsu .................. H04W 4/02 370/328 |
| 2013/0150126 A1 | 6/2013 | Pattaswamy et al. |
| 2013/0210481 A1 | 8/2013 | Sane et al. |
| 2013/0215846 A1 | 8/2013 | Yerrabommanahalli et al. |
| 2014/0198640 A1* | 7/2014 | Suzuki ................... H04L 47/76 370/230 |

OTHER PUBLICATIONS

Unknown, Author, "3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.2.0, Sep. 2013, 1-352.

* cited by examiner

DYNAMIC NEIGHBORING CELL MEASUREMENTS

TECHNICAL FIELD

The present invention relates generally to the field of wireless communication. More particularly, it relates to neighboring cell measurements in a wireless communication network.

BACKGROUND

It is a common situation that a wireless communication device (also referred to as the device hereinafter) supports communication in accordance with two or more radio access technologies (RATs). For example, a mobile telephone may support communication in a wireless communication system using two or more of a RAT in accordance with the GSM (Global System for Mobile communication) standard, a RAT in accordance with the UMTS (Universal Mobile Telecommunication Standard) standard, and a RAT in accordance with the UMTS LTE (UMTS Long Term Evolution) standard.

The subscription identifier (e.g. a subscriber identity module—SIM—card) used in combination with the device may in turn define one or more RATs that are allowed for use in relation to that particular subscription. The RATs allowed by the subscription may be the same RATs as supported by the device. Alternatively, one or more of the RATs supported by the device may not be allowed by the subscription. Yet alternatively (or additionally), the subscription may allow RATs that are not supported by the device. For example, a device that supports GSM, UMTS and UMTS LTE may be used in combination with a SIM card that allows only GSM and UMTS (which is typical for older SIM cards).

In such (and similar) situations, it may be so that emergency calls are allowed over the RAT(s) supported by the device but not otherwise allowed by the subscription. In the example above, emergency calls may typically be allowed over LTE (using VoLTE—Voice over LTE) even though the SIM card allows only GSM and UMTS.

It is, of course, desirable that emergency calls are enabled as far as possible. However, for emergency calls to be possible using a RAT (e.g. UMTS LTE) that is not allowed for normal use by the subscription it is typically required that the device performs various neighboring cell measurements for that RAT also. Such measurements may, for example, include one or more of mobility management (MM) measurements, radio resource management (RRM) measurements, cell search, signal strength measurements (e.g. reference signal received power—RSRP, received signal strength indicator—RSSI, and/or reference signal received quality—RSRQ), etc. Typically, the neighboring cell measurements are then correspondingly processed by the device (including e.g. comparison of signal strength, keeping of a neighboring cell list, etc.).

Performing these measurements and/or the corresponding processing consumes resources of the device such as, for example, power, processing capacity, storage area, etc. It may be desirable to be careful regarding consumption of such resources. For example, high power consumption may require the battery of the device to be charged more often. Furthermore, when the radio of a single radio architecture is used for measurements of one RAT, it cannot be used for measurements and/or communication of another RAT.

Therefore, there is a need for methods and arrangements that enable emergency calls using a RAT that is supported by the device but not allowed for normal use by a subscription used with the device, while keeping related resource consumption of the device at a reasonable level.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and arrangements that enable emergency calls while keeping related resource consumption at a reasonable level.

According to a first aspect, this is achieved by a method of a wireless communication device connectable to a subscriber identity module and adapted to communicate with a wireless communication network using one of a first radio access technology and a second radio access technology.

The method comprises determining if the subscriber identity module supports the second radio access technology and determining if the wireless communication network supports emergency call using the second radio access technology.

If the subscriber identity module does not support the second radio access technology, the method comprises performing neighboring cell measurements for the second radio access technology only if the wireless communication network supports emergency call using the second radio access technology.

In some embodiments, the method may further comprise disabling neighboring cell measurements for the second radio access technology if the subscriber identity module does not support the second radio access technology and the wireless communication network does not support emergency call using the second radio access technology.

According to some embodiments, the method may comprise disabling neighboring cell measurements for the second radio access technology if the subscriber identity module does not support emergency call using the second radio access technology and enabling neighboring cell measurements for the second radio access technology if the subscriber identity module does not support emergency call using the second radio access technology in response to an emergency call being initiated.

Enabling neighboring cell measurements for the second radio access technology may, according to some embodiments, be performed only if emergency call is not possible using the first radio access technology.

The method may be performed in response to powering on the wireless communication device in some embodiments.

According to some embodiments, the method may further comprise repeating the step of determining if the wireless communication network supports emergency call using the second radio access technology in response to registering a measurement method update triggering event. The measurement method update triggering event may, for example, comprise one of a network retrieval event, a routing event, a network attach event, and a network update event.

The second radio access technology may, for example, comprise a technology according to Universal Mobile Telecommunication Standard Long Term Evolution (UMTS LTE) and the first radio access technology may, for example, comprise a technology according to one or more of Global System for Mobile communication (GSM) and Universal Mobile Telecommunication Standard (UMTS).

The subscriber identity module may be a SIM card, a virtual SIM or any other suitable known or future subscriber identification.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is an arrangement of a wireless communication device. The arrangement comprises a subscriber identity module reader, a transceiver, a measurement management unit, and a controller.

The subscriber identity module reader is connectable to a subscriber identity module and the transceiver is adapted to enable communication between the wireless communication device and a wireless communication network using one of a first radio access technology and a second radio access technology. The measurement management unit is adapted to cause the transceiver to perform neighboring cell measurements.

The controller is adapted to determine if the subscriber identity module supports the second radio access technology and to determine if the wireless communication network supports emergency call using the second radio access technology.

The controller is also adapted to (if the subscriber identity module does not support the second radio access technology) instruct the measurement management unit to cause the transceiver to perform neighboring cell measurements for the second radio access technology only if the wireless communication network supports emergency call using the second radio access technology.

In some embodiments, the controller may be adapted to perform the determination of whether the subscriber identity module supports the second radio access technology in response to the wireless communication device being powered on.

According to some embodiments, the controller may be adapted to perform the determination of whether the wireless communication network supports emergency call using the second radio access technology in response to the wireless communication device being powered on and in response to registering a measurement method update triggering event. The measurement method update triggering event may, for example, comprise one of a network retrieval event, a routing event, a network attach event, and a network update event.

A fourth aspect is a wireless communication device comprising the arrangement according to the third aspect.

In some embodiments, the third and fourth aspects may additionally have features identical with or corresponding to any of the various features as explained above for the first aspect and vice versa.

An advantage of some embodiments is that the possibility to make emergency calls is not limited by the subscription used with the wireless communication device.

Another advantage of some embodiments is that the power consumption is lowered compared to a solution where neighboring cell measurements on the second radio access technology are not conditioned on whether or not the wireless communication network supports emergency call using the second radio access technology. Thus, less energy is consumed, which may lead to a smaller battery being needed and/or an increased standby time.

Yet another advantage of some embodiments is that the radio is not unnecessarily occupied by measurements of the second radio access technology. Therefore, the radio may, for example, be used for more precise measurements of the first radio access technology thereby improving the mobility management.

A further advantage of some embodiments (compared to a situation when neighboring cell measurements of the second radio access technology are disabled completely if the subscriber identity module does not support the second radio access technology) is that system information regarding the first radio access technology may be achieved via the measurements of the second radio access technology, which may improve the mobility management.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a wireless communication device performs neighboring cell measurements for a radio access technology which is not supported (i.e. allowed for communication other than emergency calls) by a subscription associated with the device only if the wireless communication network that the device is currently in supports emergency call using that radio access technology.

Thus, a wireless communication device connectable to a subscriber identity module and adapted to communicate with a wireless communication network using one of a first radio access technology and a second radio access technology determines if the subscriber identity module supports the second radio access technology and if the wireless communication network supports emergency call using the second radio access technology. If the subscriber identity module does not support the second radio access access technology only if the wireless communication network supports emergency call using the second radio access technology.

In the following, the second radio access technology will be exemplified by UMTS LTE and the first radio access technology will be exemplified with GSM/UMTS. It should be noted that this is merely for illustrative purposes and that embodiments may be equally applicable to other combinations of radio access technologies.

Figure 1:
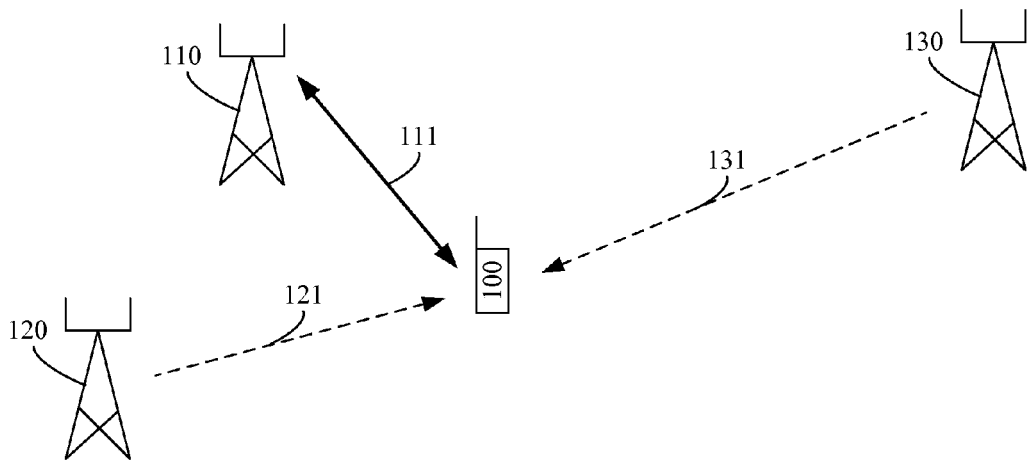
FIG. 1 is a schematic drawing of a wireless communication device in a wireless communication network scenario according to some embodiments.

FIG. 1 illustrates a situation where a wireless communication device 100 is present in a wireless communication network. The wireless communication network comprises a GSM/UMTS base station 110 and two LTE base stations 120, 130. The device 100 is capable of GSM/UMTS communication as well as UMTS LTE communication. However, a SIM card currently used in connection with the device 100 only supports GSM/UMTS communication. Thus, the device 100 is registered at the GSM/UMTS base station 110 (e.g. camps on it in idle mode and is connected to it in other modes) as illustrated by arrow 111 in FIG. 1.

If an emergency call is to be made from the device 100, there may be one or more reasons why it may be desirable or necessary to make the emergency call using UMTS LTE instead of using GSM/UMTS.

For example, one may need to use UMTS LTE for the emergency call if there is no GSM/UMTS coverage at the present location of the device 100. This may be the case if the device 100 has moved to another location, or if the base station 110 has been disabled for some reason. A similar situation may arise if the traffic load of the base station 110 is so high that even an emergency call is not possible (e.g. in case of numerous emergency calls being made at the same time). In another example, it may be desirable to use UMTS LTE for the emergency call to balance traffic load if the traffic load of the base station 110 is high.

To be able to have the possibility to make emergency calls over UMTS LTE, the device 100 has to be aware of the closest UMTS LTE base station(s) 120, 130, which is possible via performing neighboring cell measurements on UMTS LTE (illustrated by the arrows 121 and 131 in FIG. 1) even though the SIM card does not allow communication using UMTS LTE.

Using UMTS LTE for the emergency call is, of course, only possible if the UMTS LTE network accessible by the device 100 supports emergency calls over LTE. However, not all UMTS LTE networks support emergency calls over LTE. Whether or not the network supports emergency call (or any voice services) over UMTS LTE may be signaled from the network to the device. For example, the network support of emergency call over UMTS LTE (IP Multimedia Subsystem—IMS—emergency call) may be specified the "network feature support" field of the ATTACH ACCEPT message (e.g. IEI 64 "EPS network feature support") of $3^{rd}$ Generation Partnership Project (3GPP) Technical Specification (TS) 24.301 (see Sections 8.2.1 and 9.9.3.12A).

Performing neighboring cell measurements for UMTS LTE even though the SIM card does not allow communication using UMTS LTE would be a waste of resources if the network does not support emergency calls over LTE.

Therefore, embodiments teach that (when the SIM card used by the device 100 does not allow communication using UMTS LTE) neighboring cell measurements for UMTS LTE are only to be performed if the network supports emergency call over LTE. Such measurements may be performed on a default basis in these cases, or an initiation of an emergency call may trigger the measurements. In some embodiments, the measurements are only triggered if an emergency call is initiated and a decision is taken to use UMTS LTE for the emergency call (e.g. if the call fails on GSM/UMTS).

Thus, through embodiments presented herein, the possibility to make emergency calls is maximized while minimizing un-necessary neighboring cell measurements.

Figure 2:
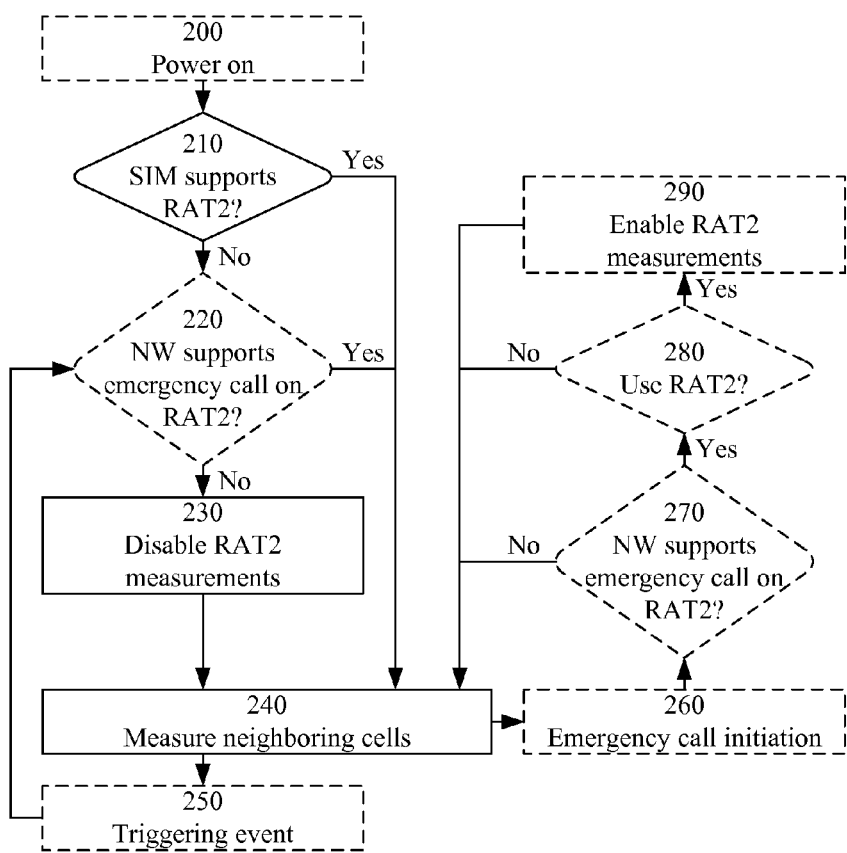
FIG. 2 is a flowchart illustrating example method steps according to some embodiments.

FIG. 2 illustrate a method according to some embodiments for a wireless communication device connectable to a subscriber identity module (SIM) and adapted to communicate with a wireless communication network using one of a first radio access technology (RAT1) and a second radio access technology (RAT2). The first radio access technology may comprise one or more than one RAT (e.g. GSM and UMTS).

The method starts in step 200 where the device is powered on and continues to step 210 where the device determines if the SIM supports the RAT2. If the SIM supports RAT2 (Yes—path out from 210) the device performs neighboring cell measurements for both RAT1 and RAT2 in step 240.

If the SIM does not support RAT2 (No—path out from 210) the method may continue to optional step 220 where it is determined if the wireless communication network supports emergency calls using RAT2. If the network supports emergency calls using RAT2 (Yes—path out from 220) the device performs neighboring cell measurements for both RAT1 and RAT2 in step 240.

If the network does not support emergency calls using RAT2 (No—path out from 220) neighboring cell measurements for RAT2 are disabled in step 230 and the device performs neighboring cell measurements for only RAT1 in step 240.

In some embodiments, steps 220, 230, 240 may be repeated even after power on. For example, these steps may be repeated periodically or in connection with a measurement method update triggering event (as illustrated by optional step 250). A triggering event may, for example, be an event where the network is potentially changed (e.g. during routing or at network recovery after an out-of-coverage period). Another triggering event may be when an update procedure is performed towards the network.

If optional step 220 is not applied, the No—path out from 210 leads directly to step 230, where neighboring cell measurements for RAT2 are disabled in step 230 and the device performs neighboring cell measurements for only RAT1 in step 240.

If, in step 240, neighboring cell measurements are performed for only RAT1, an initiation of an emergency call (as illustrated by step 260) may cause a re-evaluation of the neighboring cell measurement method.

Thus, it may be determined in step 270 if the wireless communication network supports emergency calls using RAT2. In some embodiments, the check of step 270 is only made for the subscribed network (e.g. Home Public Land Mobile Network—HPLMN, Equivalent Public Land Mobile Network—EPLMN). In other embodiments, the check of step 270 is made for all (or a sub-set of) Public Land Mobile Network—PLMN—in range.

If the network does not support emergency calls using RAT2 (No—path out from 270) neighboring cell measurements for RAT2 should not be enabled and the device continues to perform neighboring cell measurements for only RAT1 in step 240.

If the network supports emergency calls using RAT2 (Yes—path out from 270) it may be determined in step 280 whether or not the emergency call should be attempted using RAT2 (e.g. if RAT1 cannot be used for some reason). Some possible reasons for using RAT2 in this situation have been mentioned above. For example, if the device is out-of-service of the RAT1 network, RAT2 may be used for the emergency call.

If the emergency call should be attempted using RAT2 (Yes—path out from step 280) neighboring cell measurements for RAT2 are enabled in step 290 and the device performs neighboring cell measurements for both RAT1 and RAT2 in step 240 to be able to set up the emergency call.

If the emergency call should not be attempted using RAT2 (No—path out from step 280) neighboring cell measurements for RAT2 should not be enabled and the device continues to perform neighboring cell measurements for only RAT1 in step 240.

The determination steps 270 and 280 may be performed in any order or in parallel.

Some example versions of the method of FIG. 2 comprise the following combinations of steps:
200, 210, 220, 230, 240
200, 210, 220, 230, 240, 250
200, 210, 230, 240, 260, 270, 290
200, 210, 230, 240, 260, 270, 280, 290

Figure 3:
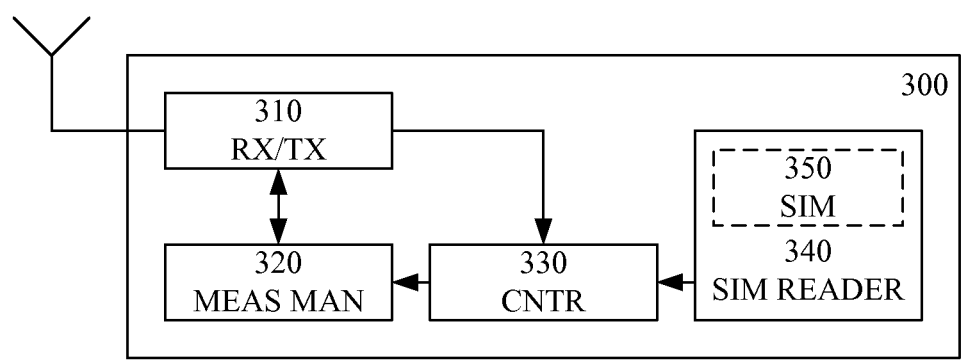
FIG. 3 is a schematic block diagram illustrating an example arrangement according to some embodiments.

FIG. 3 schematically illustrate an arrangement 300 for a wireless communication device. The arrangement 300 may, for example, be adapted to perform the method described in connection to FIG. 2.

The arrangement 300 comprises a subscriber identity module reader (SIM READER) 340 connectable to a subscriber identity module (SIM) 350, a transceiver (RX/TX) 310, a measurement management unit (MEAS MAN) 320 and a controller (CNTR) 330.

The transceiver 310 is adapted to enable communication between the device and a wireless communication network using one of a first radio access technology (RAT1) and a second radio access technology (RAT2).

The measurement management unit 320 is adapted to cause the transceiver 310 to perform neighboring cell measurements (compare with step 240 of FIG. 2).

The controller 330 is adapted to determine if the SIM 350 supports RAT2 (compare with step 210 of FIG. 2). This determination may, for example, be performed in response to the device being powered on (compare with step 200 of FIG. 2).

The controller 330 is also adapted to determine if the network supports emergency call using RAT2, for example, based on information in signals received by the transceiver 310 from the network and forwarded to the controller 330 (compare with steps 220 and 270 of FIG. 2). This determination may, for example, be performed in response to the device being powered on (compare with step 200 of FIG. 2) and possibly also in response to registering a measurement method update triggering event (compare with step 250 of FIG. 2).

The controller 330 is also adapted to instruct the measurement management unit 320 regarding whether or not to perform neighboring cell measurements for RAT2 based on the above determinations. Responsive to the subscriber identity module not supporting RAT2, the controller 330 instructs the measurement management unit 320 that neighboring cell measurements for RAT2 should be performed only if the network supports emergency call using RAT2 (compare with the different variants described in connection to FIG. 2).

As elaborated on above, embodiments enable emergency calls over a RAT not supported by the current subscription when at all possible, while not wasting power on performing unnecessary neighboring cell measurements.

The possibility to make emergency calls is not limited by the subscription used with the wireless communication device, but rather by the configuration of the reachable networks (if they support emergency call over UMTS LTE or not) and by the capability of the device itself (whether it is UMTS LTE capable).

Tests performed in a live network shows that significant savings may be achieved if neighboring cell measurements for UMTS LTE are disabled when the SIM supports only GSM/UMTS.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, a USB-stick, a plug-in card, an embedded drive, or a mobile gaming device.

Figure 4:
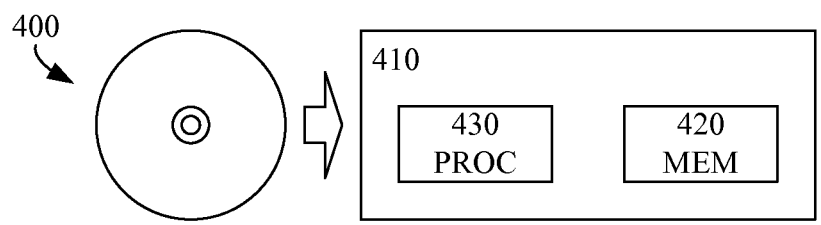
FIG. 4 is a schematic drawing illustrating a computer readable medium according to some embodiments.

According to some embodiments, a computer program product comprises a computer readable medium such as, for example, a diskette or a CD-ROM as illustrated by the CD-ROM 400 of FIG. 4. The computer readable medium may have stored thereon a computer program comprising program instructions. The computer program may be loadable into a data-processing unit (e.g. the data processing unit (PROC) 430 of FIG. 4), which may, for example, be comprised in a wireless communication device (e.g. the mobile terminal 410 of FIG. 4). When loaded into the data-processing unit, the computer program may be stored in a memory (e.g. the memory (MEM) 420 of FIG. 4) associated with or integral to the data-processing unit. According to some embodiments, the computer program may, when loaded into and run by the data-processing unit, cause the data-processing unit to execute method steps according to, for example, the method shown in FIG. 2.

Reference has been made herein to various embodiments. However, a person skilled in the art would recognize numerous variations to the described embodiments that would still fall within the scope of the claims. For example, the method embodiments described herein describe example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method in a wireless communication device connectable to a subscriber identity module and adapted to communicate with a wireless communication network using one of a first radio access technology and a second radio access technology, the method comprising:
   determining whether the subscriber identity module supports the second radio access technology;
   determining whether the wireless communication network supports emergency call using the second radio access technology; and selectively performing neighboring cell measurements for the second radio access technology, based on the determining of whether the subscriber identity module supports the second radio access technology and based on the determining of whether the wireless communication network supports emergency call using the second radio access technology, wherein selectively performing the neighbor cell measurements for the second radio access technology comprises, in the event that the subscriber identity module does not support the second radio access technology, performing neighboring cell measurements for the second radio access technology only in response to determining that the wireless communication network supports emergency call using the second radio access technology.

2. The method of claim 1, wherein selectively performing the neighbor cell measurements for the second radio access technology comprises disabling neighboring cell measurements for the second radio access technology in response to determining that the subscriber identity module does not support the second radio access technology and the wireless communication network does not support emergency call using the second radio access technology.

3. The method of claim 1, wherein selectively performing the neighbor cell measurements for the second radio access technology comprises:
  disabling neighboring cell measurements for the second radio access technology in response to determining that the subscriber identity module does not support emergency call using the second radio access technology; and
  enabling neighboring cell measurements for the second radio access technology in response to determining that the subscriber identity module does not support emergency call using the second radio access technology in response to an emergency call being initiated.

4. The method of claim 3, wherein enabling neighboring cell measurements for the second radio access technology is only performed in response to determining that emergency call is not possible using the first radio access technology.

5. The method of claim 1, wherein the method is performed in response to powering on the wireless communication device.

6. The method of claim 1, further comprising repeating the step of determining whether the wireless communication network supports emergency call using the second radio access technology in response to registering a measurement method update triggering event.

7. The method of claim 6, wherein the measurement method update triggering event comprises one of a network retrieval event, a routing event, a network attach event, and a network update event.

8. The method of claim 1, wherein the second radio access technology comprises a technology according to Long Term Evolution (UMTS LTE), and wherein the first radio access technology comprises a technology according to one or more of Global System for Mobile communication (GSM) and Universal Mobile Telecommunications System (UMTS).

9. A non-transitory computer-readable medium comprising, stored thereupon, a computer program comprising program instructions, the computer program being executable by a data processing unit in a wireless communication device connectable to a subscriber identity module and adapted to communicate with a wireless communication network using one of a first radio access technology and a second radio access technology, wherein the computer program is adapted to cause the wireless communication device to:
  determine whether the subscriber identity module supports the second radio access technology;
  determine whether the wireless communication network supports emergency call using the second radio access technology; and
  selectively perform neighboring cell measurements for the second radio access technology, based on the determining of whether the subscriber identity module supports the second radio access technology and based on the determining of whether the wireless communication network supports emergency call using the second radio access technology;
  wherein selectively performing neighboring cell measurements comprises, in the event that the subscriber identity module does not support the second radio access technology, performing neighboring cell measurements for the second radio access technology only in response to determining that the wireless communication network supports emergency call using the second radio access technology.

10. A wireless communication device comprising:
  a subscriber identity module reader connectable to a subscriber identity module;
  a transceiver adapted to enable communication between the wireless communication device and a wireless communication network using one of a first radio access technology and a second radio access technology; and
  a processing circuit configured to:
    cause the transceiver to perform neighboring cell measurements;
    determine whether the subscriber identity module supports the second radio access technology;
    determine whether the wireless communication network supports emergency call using the second radio access technology; and
    selectively perform neighboring cell measurements for the second radio access technology, based on the determining of whether the subscriber identity module supports the second radio access technology and based on the determining of whether the wireless communication network supports emergency call using the second radio access technology;
    wherein selectively performing neighboring cell measurements for the second radio access technology comprises, in the event that the subscriber identity module does not support the second radio access technology, performing neighboring cell measurements for the second radio access technology only in response to determining that the wireless communication network supports emergency call using the second radio access technology.

11. The wireless communication device of claim 10, wherein the processing circuit is configured to perform the determination of whether the subscriber identity module supports the second radio access technology in response to the wireless communication device being powered on.

12. The wireless communication device of claim 10, wherein the processing circuit is configured to perform the determination of whether the wireless communication network supports emergency call using the second radio access technology in response to the wireless communication device being powered on and in response to registering a measurement method update triggering event.

13. The wireless communication device of claim 12, wherein the measurement method update triggering event comprises one of a network retrieval event, a routing event, a network attach event, and a network update event.

* * * * *